United States Patent [19]

Affa

[11] 4,262,423
[45] Apr. 21, 1981

[54] ERROR CORRECTION APPARATUS FOR A LENGTH-MEASURING INSTRUMENT AND METHOD FOR GENERATING AN ERROR CORRECTION PROFILE

[75] Inventor: Alfred Affa, Stein, Fed. Rep. of Germany

[73] Assignee: Dr. Johannes Heidenhain GmbH, Traunreut, Fed. Rep. of Germany

[21] Appl. No.: 37,118

[22] Filed: May 8, 1979

[30] Foreign Application Priority Data

May 12, 1978 [DE] Fed. Rep. of Germany ....... 2820753

[51] Int. Cl.³ .............................................. G01B 11/02
[52] U.S. Cl. .................................................. 33/125 A
[58] Field of Search ............. 33/125 T, 125 C, 125 R, 33/125 A, 1 M, 189

[56] References Cited

U.S. PATENT DOCUMENTS

| | | | |
|---|---|---|---|
| 2,995,826 | 8/1961 | Brault | 33/125 T X |
| 3,212,194 | 10/1965 | Brault | 33/125 T X |
| 3,942,895 | 3/1976 | Meyer et al. | 33/125 C |
| 4,152,837 | 5/1979 | Nelle et al. | 33/125 C |
| 4,170,828 | 10/1979 | Ernst . | |

FOREIGN PATENT DOCUMENTS 866402 2/1953 Fed. Rep. of Germany .
2042505 2/1972 Fed. Rep. of Germany .

Primary Examiner—William D. Martin, Jr.
Attorney, Agent, or Firm—Hume, Clement, Brinks, Willian & Olds, Ltd.

[57] ABSTRACT

An error correction apparatus for a precision measuring instrument includes an error correction profile which is formed as an integral part of a structural member of the measuring instrument, thereby avoiding the need for a separately mounted and adjusted profile member. Preferably, the integral profile of this invention is shaped after the instrument has been calibrated with the measuring scale mounted in place on the structural member which defines the profile.

6 Claims, 9 Drawing Figures

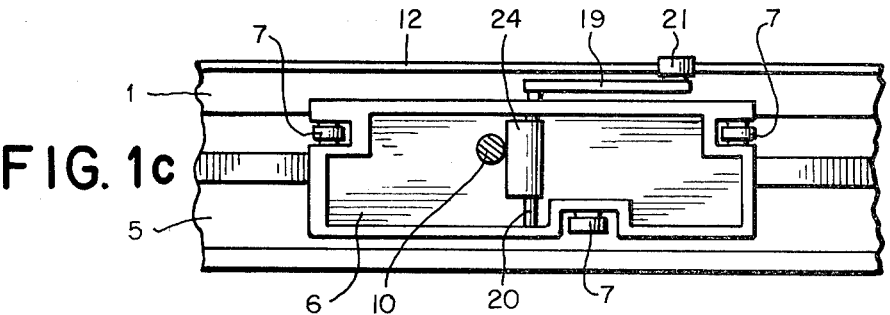
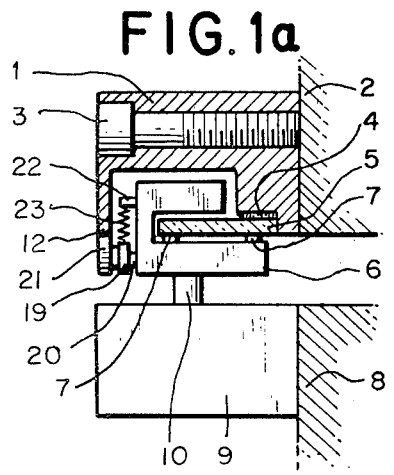
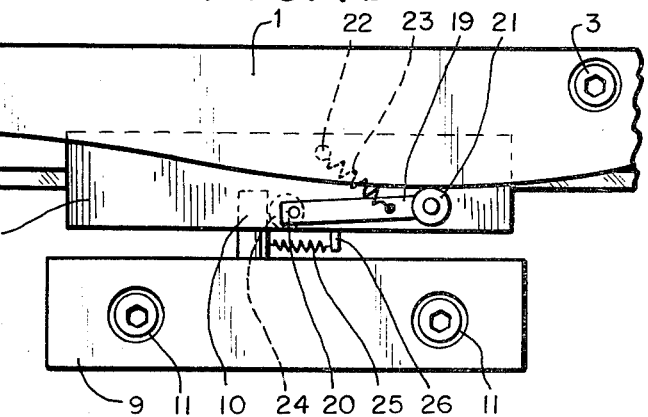
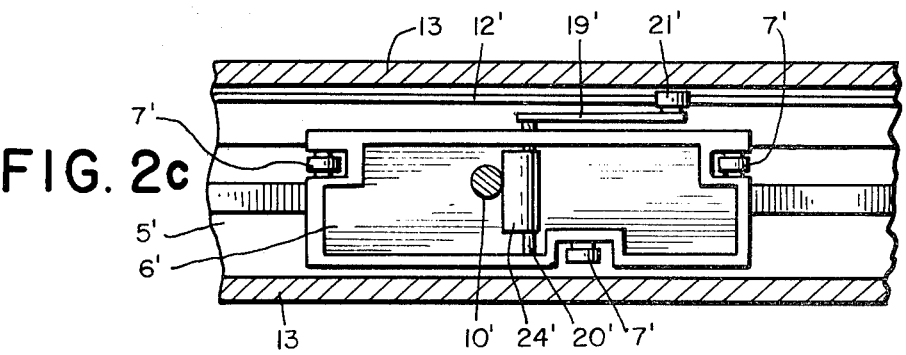
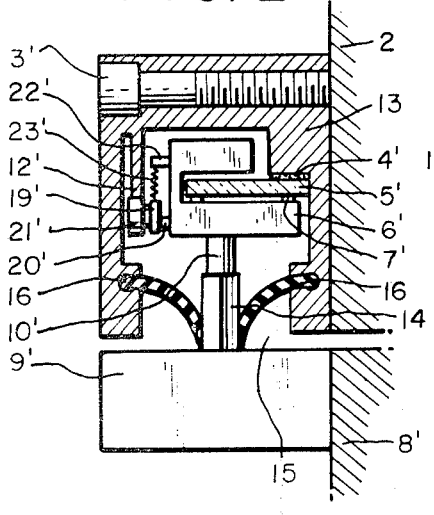
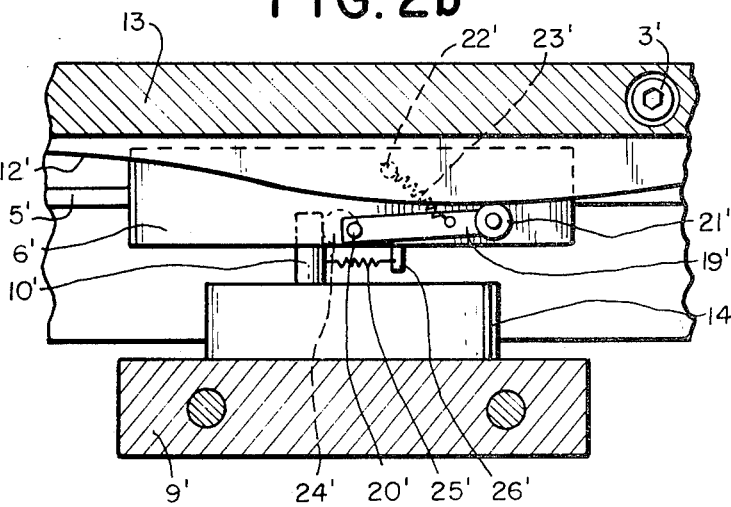

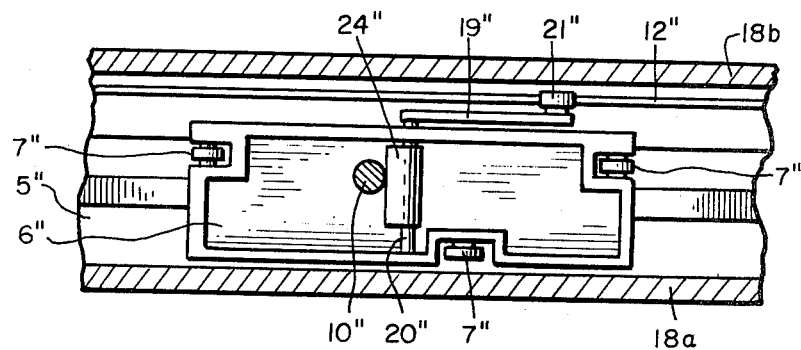
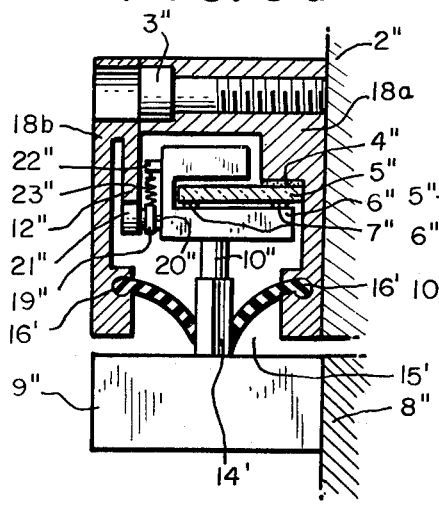
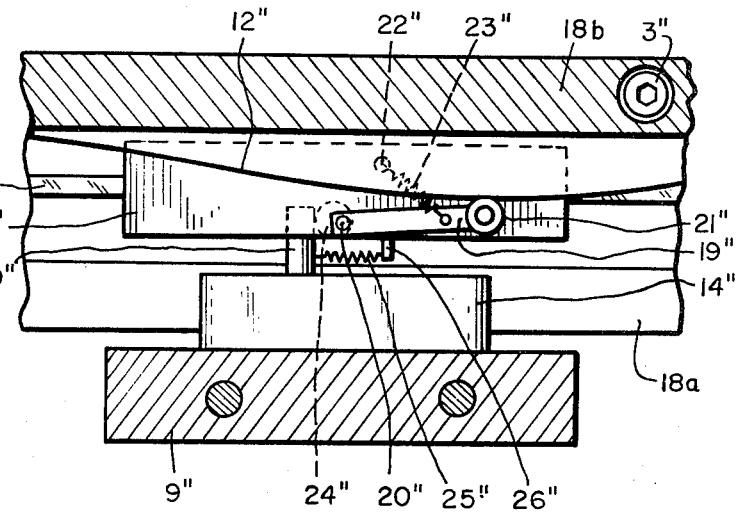

ERROR CORRECTION APPARATUS FOR A LENGTH-MEASURING INSTRUMENT AND METHOD FOR GENERATING AN ERROR CORRECTION PROFILE

BACKGROUND OF THE INVENTION

The present invention relates to an apparatus for error correction in precision machines and measuring instruments, particularly in length-measuring instruments in which a scale is fastened to a carrier for measuring the relative position of two objects.

Several types of apparatus and methods for the correction of machine and scale errors are known to those skilled in the art. For example, German Pat. No. 866,402 discloses a measuring apparatus having a correction rule in which the measurement cursor is controlled mechanically into a position corresponding to the respective error of a spindle with respect to the scale. U.S. Pat. No. 3,039,032 discloses a position measuring system including a correction template which is scanned by a sensor that acts directly on the measurement indicator. Yet another error correction system is described in German Patent specification OS 2,042,505, in which a numerical measuring system of a machine is adjusted by an additional movement corresponding to the respective error value of the machine spindle through a tracking member which scans a correction template. Each of the foregoing correction arrangements utilizes a separate correction template or correction rule, which is fastened to the measuring instrument and adjusted in place after the measuring instrument is produced.

SUMMARY OF THE INVENTIONS

The present invention is directed to a particularly simple apparatus for error correction in measuring instruments. According to this invention a measuring instrument is provided with a scale mounted on a carrier member and an error correction profile is formed as an integral part of the carrier member. In a first preferred embodiment of the invention the error correction profile is formed as an integral part of a housing surrounding the scale; in a second preferred embodiment the measuring instrument is provided with a two-part housing and the error correction profile is formed as an integral part of one part of the two-part housing.

One important advantage of the present invention is that the error correction profile is an integral part of a structural member, the carrier member, which is present in the length-measuring instrument in any case. For example, the correction profile can be formed in a scale carrier, a housing or a housing member. In this way the fastening and adjustment of a separate error correction profile to the measuring instrument becomes unnecessary.

The invention itself, together with further objects and attendant advantages, will best be understood by reference to the following detailed description taken in connection with the accompanying drawings.

BRIEF DESCRIPTION OF THE DRAWINGS

FIGS. 1a, 1b and 1c show three cross sectional views of a first embodiment of a length-measuring instrument according to the present invention, in which a scale is fastened to a carrier member.

FIGS. 2a, 2b and 2c show three cross sectional views of a second embodiment of a length-measuring instrument in which a scale is mounted inside a tubular housing.

FIGS. 3a, 3b and 3c show three cross sectional views of a third embodiment of a length-measuring instrument, in which a scale is mounted inside a two-part housing.

DETAILED DESCRIPTION OF PREFERRED EMBODIMENTS

Referring now to the drawings, FIGS. 1a, 1b and 1c present a length-measuring instrument having a carrier member 1 which is fastened to a bed 2 of a tooling machine or a measuring machine by a fastener such as a screw 3. A scale 5 is mounted on the carrier member 1 by means of an elastic layer of adhesive 4 to form the measuring standard. A scanning unit 6 is supported by means of rollers 7 on the scale 5, and includes conventional means (not shown) for scanning the division of the scale 5. A mounting base 9 is secured to a slide piece 8 of the tooling machine or measuring machine by means of a screw connection 11. This base 9 includes a coupling member 10 which transfers relative movement of the bed 2 and slide piece 8 to the scanning unit 6. In the absence of suitable error correction, machine and scale errors would likewise be transferred to the measurement and would enter into measuring result as errors. The length-measuring instrument of FIGS. 1a, 1b and 1c presents, therefore, an error correction apparatus according to the invention which includes an error correction profile 12 formed as an integral part of the carrier member 1. The construction and operation of this error correction apparatus is described in detail below.

In a second preferred embodiment of a length measuring instrument, as shown in FIGS. 2a, 2b and 2c, a housing 13 in the form of a tubular profile is fastened to a bed 2' of a tooling machine or a measuring machine by means of a screw connection 3'. On a slide piece 8' of the tooling machine or measuring machine there is fastened a mounting base 9' which defines a coupling member 10'. This coupling member 10' includes a tapered, blade-shaped portion 14 which passes through a slit 15 into the otherwise completely enclosed housing 13. Flexible sealing lips 16 are mounted adjacent the slit 15 to prevent contaminants from passing into the interior of the housing 13. On an inner surface of the housing 13 there is mounted a scale 5' by means of an elastic adhesive layer 4'. A scanning unit 6' is supported by means of rollers 7' on the scale 5', and includes conventional means (not shown) for scanning the division of the scale 5'. Relative movement of the bed 2' and the slide piece 8' is transferred from the coupling member 10' onto the scanning unit 6'. According to the invention an error correction profile 12' is provided as an integral member of the housing 13 for the compensation of machine and scale errors.

A third preferred embodiment of the invention is shown in FIGS. 3a, 3b and 3c. In this embodiment the carrier member takes the form of a two-part housing 18a, 18b which is fastened to a bed 2" of a tooling machine or a measuring machine. On a slide piece 8" of the tooling machine or measuring machine there is fastened in any suitable manner a mounting base 9" including a coupling member 10" which extends through a slit 15' provided with sealing lips 16' into the two-part housing 18a, 18b. To an inner surface of the housing part 18a a scale 5" is affixed by means of an elastic adhesive layer 4″, and a scanning unit 6″ is supported by means of rollers 7″ on the scale 5 in order to scan the division of the scale 5″. Relative movement between the bed 2″ and the slide piece 8″ is transferred via the coupling member 10″ to the scanning unit 6″. According to this invention an error correction profile 12″ is provided as an integral component of the housing part 18b for the compensation of machine and scale errors.

In each of the foregoing embodiments an error correction profile 12, 12′, 12″ is traced by a transfer element in the form of a lever arm 19,19′,19″ which is pivotably mounted to the scanning unit 6,6′,6″ about an axis 20,20′,20″. This lever arm 19,19′19″ includes a roller 21, 21′,21″ on its longer free end which is biased against the error correction profile 12,12′,12″ by means of a spring 23,23′,23″, fastened to a pivot 22,22′,22″ of the scanning unit 6,6′,6″. As the scanning unit 6,6′,6″ moves along the scale 5,5′5″, the lever arm 19,19′19″ follows the curve of the error correction profile 12,12′,12″ and brings about a pivoting movement of the lever arm 19,19′,19″ about the axis 20,20′,20″ which corresponds to the desired error correction. The error correction is actually performed by an eccentric 24,24′,24″ rigidly mounted to the shorter free end of the lever arm 19,19′,19″, which eccentric contacts the coupling member 10,10′,10″ and converts the pivoting movement of the lever arm 19,19′,19″ into a relative movement between the scanning unit 6,6′,6″ and the coupling member 10,10′,10″. The eccentric 24,24′,24″ is biased toward the coupling member 10,10′,10″ by means of a second spring 25,25′,25″ which is fastened to a second pivot 26,26′,26″ of the scanning unit 6,6′,6″.

The error correction profile 12,12′,12″ corresponds to the desired error correction and is preferably generated by means of a computer-supported program either during or after calibration of the scale 5,5′,5″ in the use position in the length-measuring instrument on the carrier member 1, the housing 13 or the housing part 18b. In the production of the error correction profile 12″ the housing part 18b is reproducibly fastened to the housing part 18a by means of fitting pins (not represented). For the purpose of better accessibility, for example in cleaning the scale 5″, the housing part 18b is detachable from the housing part 18a.

The error correction profile 12,12′, 12″ can be formed through mechanical or other suitable techniques as, for example, by milling, etching or coating.

One important advantage of the present invention is that the error correction profile 12,12′,12″ is an integral component of a structural member, such as the carrier member 1, the housing 13 or the housing part 18b, which is present in any case on the length-measuring instrument. In this way fastening and adjusting of a separate error correction profile is rendered unnecessary, and a particularly simple and accurate compensation of machine and scale errors is made possible.

Of course, it should be understood that various changes and modifications to the preferred embodiments described herein will be apparent to those skilled in the art. For example, the invention can be used in photo-electric digital length measuring instruments, as well as in optical, inductive, magnetic, capacitive, and other measuring instruments. Such changes and modifications can be made without departing from the scope of the present invention and without diminishing its attendant advantages. It is, therefore, intended that such changes and modifications be covered by the following claims.

I claim:

1. A precision measuring instrument comprising:
    a carrier member;
    a measuring scale mounted on the carrier member;
    a scanning unit guided along the scale;
    a coupling member coupled to the scanning unit and mounted to an object whose position is to be measured;
    an error correction profile included in and formed in one piece with the carrier member as an integral part of the carrier member; and
    means, responsive to the error correction profile, for modifying the relative position of the scanning unit with respect to the scale to effect an error correction corresponding to the contour of the error correction profile.

2. The invention of claim 1 wherein the carrier member is a housing which substantially surrounds the scale and the error correction profile is an integral part of the housing.

3. The invention of claim 1 wherein the carrier member is a two-part housing which substantially surrounds the scale and the error correction profile is an integral part of and formed in one piece with one part of the two-part housing.

4. The invention of claim 1 or 2 or 3 wherein the modifying means includes means, responsive to the error profile, for adjusting the separation between the scanning unit and the coupling member to effect the desired error correction.

5. The invention of claim 4 wherein the adjusting means includes a lever arm pivotably mounted to the scanning unit, a roller mounted at one end of the lever arm to contact the error correction profile, and an eccentric mounted at the other end of the lever arm to contact the coupling member.

6. In a precision measuring instrument including an elongated measuring scale, a tubular housing which substantially surrounds the scale, an adhesive layer which bonds the scale to the housing, a scanning unit guided along the scale within the housing, and a coupling member having a first end which extends out of the housing and is mounted to an object whose position is to be measured and a second end coupled to the scanning unit, the improvement comprising:
    an error correction profile formed as an integral part of the housing, said profile extending substantially parallel to the scale;
    a transfer arm pivotably mounted to the scanning unit, said transfer arm having a first end section bearing a roller positioned to track along the error correction profile and a second end section bearing an eccentric positioned to contact the coupling member;
    spring means mounted between the transfer arm and the scanning unit for urging the roller against the error correction profile; and
    biasing means mounted between the scanning unit and the coupling member for urging the eccentric against the coupling member.

* * * * *